(12) United States Patent
Dziallas et al.

(10) Patent No.: US 11,073,436 B2
(45) Date of Patent: Jul. 27, 2021

(54) SENSOR DEVICE

(71) Applicants: FRAUNHOFER-GESELLSCHAFT zur Förderung der angewandten Forschung e.V., Munich (DE); IHP GmbH Leibniz-Institut für innovative Mikroelektronik, Frankfurt an der Oder (DE)

(72) Inventors: Giannino Dziallas, Berlin (DE); Lars Zimmermann, Berlin (DE); Tolga Tekin, Berlin (DE); Ha Duong Ngo, Berlin (DE)

(73) Assignees: FRAUNHOFER-GESELLSCHAFT zur Förderung der angewandten Forschung e.V., München (DE); IHP GmbH Leibniz-Institut für innovative Mikroelektronik, Frankfurt an der Oder (DE)

( * ) Notice: Subject to any disclaimer, the term of this patent is extended or adjusted under 35 U.S.C. 154(b) by 0 days.

(21) Appl. No.: 16/707,707

(22) Filed: Dec. 9, 2019

(65) Prior Publication Data

US 2020/0182716 A1 Jun. 11, 2020

(30) Foreign Application Priority Data

Dec. 10, 2018 (EP) .................................... 18211442

(51) Int. Cl.
*G01L 1/24* (2006.01)
*G01F 3/04* (2006.01)

(52) U.S. Cl.
CPC . *G01L 1/24* (2013.01); *G01F 3/04* (2013.01)

(58) Field of Classification Search
CPC ......... G06F 2203/04105; G06F 3/0421; G01L 11/025; G01L 1/24; G01L 1/243; G01L 9/0076; G01L 1/242
USPC ...................................................... 73/862.624
See application file for complete search history.

(56) References Cited

U.S. PATENT DOCUMENTS

| 4,989,979 | A | 2/1991 | Buckman |
| 9,952,719 | B2 * | 4/2018 | Li ........................... G06F 3/045 |
| 2012/0096956 | A1 | 4/2012 | Sabarinathan et al. |
| 2016/0273980 | A1 * | 9/2016 | Cai ........................ G01L 9/0076 |
| 2017/0299939 | A1 * | 10/2017 | Meister ................. G02F 1/2257 |

(Continued)

OTHER PUBLICATIONS

European Search Report issued in EP 18 211 442.1 by the European Patent Office dated Sep. 24, 2019.

*Primary Examiner* — Max H Noori
(74) *Attorney, Agent, or Firm* — Studebaker & Brackett PC

(57) ABSTRACT

A sensor device including a deflectable membrane made of a 2D nanomaterial, a first optical waveguide for guiding light, disposed adjacent to the membrane and extending along the surface of the membrane at least in a first section, as well as a measuring device for measuring, within the first section the influence of the membrane on an evanescent wave range of the light guided along the first optical waveguide. The influence of the membrane on the light guided in the optical waveguide, in particular on the evanescent wave range of the light, can be measured interferometrically by detecting phasing differences or phase shifts. This allows for a force-free readout of the membrane deflection. By using very thin 2D nanomaterials, the membrane can also react to very quick changes in force.

11 Claims, 2 Drawing Sheets

(56) References Cited

U.S. PATENT DOCUMENTS

Figure 1:
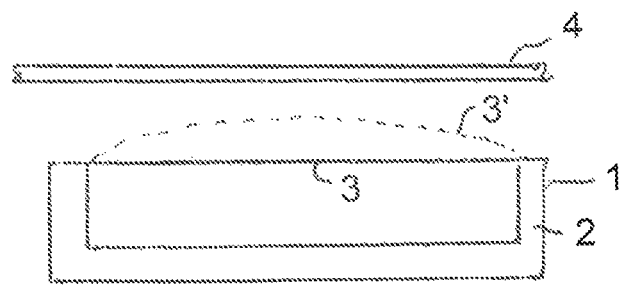

2019/0088490 A1\* 3/2019 Oppermann ............ H01L 24/96
2020/0097125 A1\* 3/2020 Mutlu .................. G02B 6/4215

\* cited by examiner

SENSOR DEVICE

The invention resides in the field of sensors and can be used particularly advantageously for force and/or pressure sensors. However, this does not preclude applicability in other areas.

In the past, sensors for various variables, using particularly thin membranes known as 2D nanomaterials, have become known. Such membranes are configured as single or multiple layers of atoms or molecules and are therefore extremely low in mass and highly flexible. Some such materials are highly solid and break resistant even in such thin forms.

Some known sensors detect a deflection of such a membrane to indicate an interaction using a light beam reflected by the membrane or by measuring an electrical capacitance or the electrical resistance of a piezo crystal.

The object of the present invention is to create a sensor, for a force or a fluid pressure, that is resistant, both mechanically and towards environmental conditions, sensitive, and that reacts quickly and reproducibly.

The invention thus relates to a sensor device including a deflectable membrane made of a flexible material, wherein the membrane in particular contains a layer made of a 2D nanomaterial or consists of a 2D nanomaterial, a first optical waveguide for guiding light, disposed adjacent to the membrane and extending along the surface of the membrane at least in a first section, as well as a measuring device, disposed along the first optical waveguide, for measuring the influence of the membrane on an evanescent wave range of the light within the first section.

The sensor device thus has a membrane made of a 2D nanomaterial. Such a material, for which specific examples are given below, typically comprises one or few atomic layers of a material or different materials and is therefore extremely low in mass and highly flexible. Such a membrane made of a 2D nanomaterial can thus easily be moved when subjected to a force or pressure. The membrane is typically clamped such that a deflection of the membrane against an elastic counterforce is possible. There is thus a clear correlation between the deflection of the membrane and the applied deflection force.

The sensor device measures the deflection of the membrane by measuring the influence of the membrane on light propagating through a first optical waveguide. The first optical waveguide is adjacent to the membrane at least in the first section such that an evanescent wave range of the light at the optical waveguide, i.e. the light component exiting the optical waveguide itself, is influenced by the proximity of the 2D nanomaterial, in particular by the dielectric permittivity of the 2D nanomaterial. Such interactions are typically achieved by providing an optical window on the optical waveguide that is constructed appropriately (see below for further details), preferably in the first section, such that in the area in which the optical waveguide extends along the membrane, the evanescent wave range of the light is sufficiently large and an influence by the 2D nanomaterial on the evanescent wave range is possible.

The interaction between the evanescent wave range and the membrane causes, by changing the dielectric permittivity, a change in the propagation constant of the light that is transported along the first optical waveguide and thus a change in the speed of the light. The propagation constant, also called the transmission parameter, is understood to mean the measure defined in transmission line theory as it applies to electromagnetic waves. When the phase of this light is compared to that of a separate beam of light which does not interact with the 2D nanomaterial, a measurement difference in the phase, for example, can be used to detect the interaction with the 2D nanomaterial.

In order to compare a light component that interacts with the 2D nanomaterial with a light beam that does not interact with the 2D nanomaterial or does so to a lesser extent, various modes propagating along the first optical waveguide may be analyzed separately from one another, provided it has been established that the interaction of the modes with the 2D nanomaterial varies due to the formation of evanescent wave ranges of varying strengths.

In a particular embodiment a device for irradiation of coherent light at least into the first optical waveguide and in particular also into a second optical waveguide, and an interferometric measuring device for measuring the propagation constant or a change in the propagation constant of the light along the first optical waveguide, in particular in comparison to the light that propagates along the second optical waveguide, is provided. In this case, the coherent light that is transported by the first optical waveguide may be compared with the light that is transported through/along the second optical waveguide, wherein the second optical waveguide displays no interaction between evanescent light and the 2D nanomaterial, or a weaker one than the first optical waveguide.

In order to measure a phase difference and to determine the change in the propagation constant, an interferometric measuring device, in which the phase length of the light that propagates along the first optical waveguide and is compared to that of the light propagating along the second optical wave guide, may be used.

A further embodiment can provide that the membrane has a graphene layer of less than 10 atomic layers, in particular less than 5 atomic layers, further in particular less than 3 atomic layers, further in particular a single atomic layer. Such 2D nanomaterials taking the shape of membranes are highly flexible and, partly for this reason, resistant as well as very light/low in mass.

The sensor device may also be configured such that the membrane has a layer consisting of less than 10 atomic layers, in particular less than 5 atomic layers, further in particular less than 3 atomic layers, further in particular a single atomic layer of one of the following substances: graphene oxide, transition metal dichalcogenide, group III-IV semiconductors, molybdenum disulfide, boron nitride, metal oxide, black phosphorus or silicon or Germanium 2D material. The substances listed are known as materials which allow the formation of mechanically stable and sufficiently thin 2D nanomaterial membranes.

A further embodiment of the sensor device may furthermore provide that the measuring device be an interferometer, in particular a Fabry-Pérot interferometer, a Mach-Zehnder interferometer, an optical ring resonator or a Michelson interferometer. The interferometer construction types mentioned above, as well as other interferometer types not listed here, allow for a measurement and determination of a relative phase length of the light that propagates along the first optical waveguide under the influence of the 2D nanomaterial.

It may furthermore be provided that the interferometer be connected to the first optical waveguide as well as a second optical waveguide, wherein the second optical waveguide is arranged such that the membrane exerts no or only little influence on the light that is guided along the second waveguide.

The first optical waveguide or both optical waveguides may be designed as thin layers applied epitaxially to a carrier material, for example as a silicon layer on an isolator. Such optical waveguides are already known in various designs.

A further embodiment of the sensor device can provide that the membrane delimits a fluid-filled, in particular a gas-filled first space, and is deflectable by pressure changes within the first space. Such a construction allows for the measurement of a hydraulic or pneumatic pressure in the first space suing the membrane, or the measurement of a force acting on the membrane and deflecting it.

It may also be provided that the membrane comprises a ferromagnetic material or a ferromagnetic component such that a magnetic field acting on the membrane causes a deflection of the membrane. In this case the effect of a magnetic field can be measured by the deflection of the membrane.

It may, for calibration of the sensor device and for adjusting the operating point, be provided that the distance between the membrane and the first optical waveguide be adjustable.

The solution described for a sensor devices furthermore comprises a method for measuring pressures or pressure changes using a membrane made of a 2D nanomaterial, wherein coherent light is guided through at least one optical waveguide arranged close enough to the membrane for an evanescent part of the light guided along the first optical waveguide interacts with the membrane material in a first section, and for a phasing and/or a phase shift of the light guided along the first optical waveguide to be measured and in particular to be compared to the phasing of light not interacting with the membrane.

Figure 2:
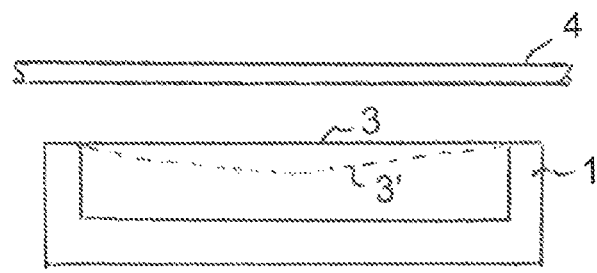
Figure 3:
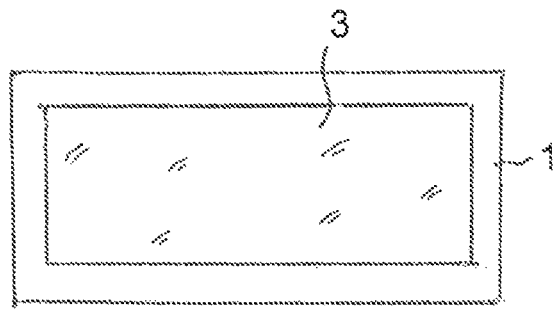
Figure 4:
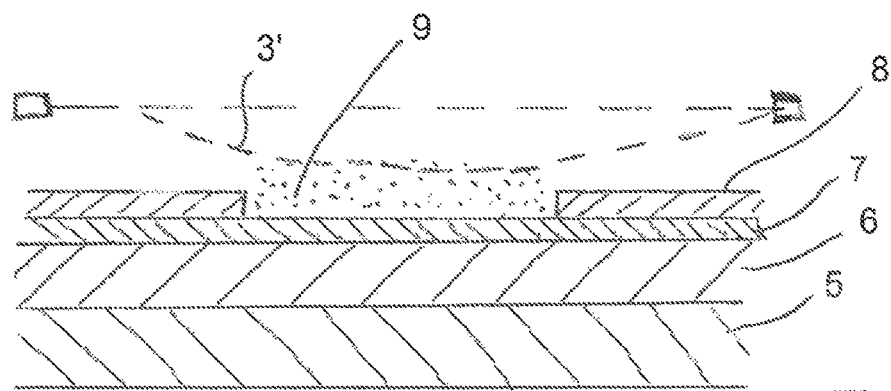
Figure 5:
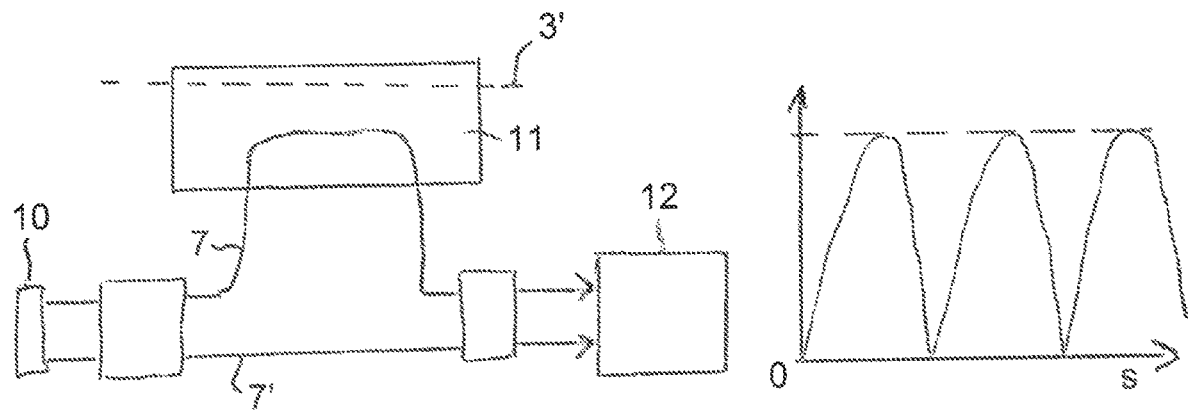

The invention will be shown and described hereafter based on an exemplary embodiment in figures of a drawing. In the drawings:

FIG. 1 is a schematic drawing of a housing with a membrane enclosing a space, wherein the membrane is adjacent to an optical waveguide, FIG. 2 is a housing similar to that of FIG. 1, including a membrane that is deflected toward an interior of the housing, FIG. 3 a top view of a membrane as a part of a housing, FIG. 4 a longitudinal section of an optical waveguide, including, inter alia, in which an interaction between light and a membrane made of a 2D nanomaterial, and FIG. 5 is a schematic drawing of a sensor device with two optical waveguides and an interferometer as well as a typical recorded measurement curve.

FIG. 1 is a schematic drawing of a cross-section of a housing 1 with a housing wall 2, wherein the housing 1 is delimited on its top side by a membrane 3, 3' made of a 2D nanomaterial. The solid line 3 at the top side of the housing 1 designates the membrane in a non-deflected state, whereas the dotted line 3' designates the membrane in a state of deflection towards the outside of the housing.

Above the housing 1 there is a schematic drawing of an optical waveguide 4 that extends along the membrane. In the deflected state 3', the membrane approached the optical waveguide such that the interaction of the membrane with an evanescent wave range of the light propagating along the optical waveguide 4 is amplified. The distance between the membrane 3, 3' and the optical waveguide 4 may typically be a few micrometers up to 100 micrometers or even up to 1 millimeter. The membrane may be deflected typically by a few micrometers, for example less than 10 micrometers.

The housing 1 may enclose a housing interior in a gas-tight or fluid-tight manner such that a pressure change in the housing 1 causes a deflection of the membrane 3, 3'. When the membrane deflection is registered by a change in the interaction of the light with the membrane, the arrangement shown may be used to measure pressure differences or pressure changes.

FIG. 2 shows a housing 1 as in FIG. 1, wherein the membrane 3, 3' is deflected away from the optical waveguide 4 in the dotted version, for example due to a decrease in pressure in the housing 1 or due to another force exerted on the membrane, for example due to the membrane being ferromagnetic and interacting with a magnetic field. The deflection of the membrane can thus be used to measure a magnetic field strength.

FIG. 3 shows the housing 1 of FIGS. 1 and 2 as viewed for above, such that the membrane 3 which is fastened to all sides of the housing wall is visible as an area in a top view. The membrane may be configured as a 2D nanomaterial, for example consisting of graphene, graphene oxide, a transition metal dichalcogenide, a group III-IV semiconductor, molybdenum disulfide, boron nitride, metal oxide, black phosphorus or silicon or Germanium 2D material, or comprise such a material together with other materials. For example, in order to detect magnetic fields, sections of the 2D nanomaterial may be coated with a ferromagnetic material of small thickness.

The optical waveguide schematically shown in FIGS. 1 and 2 is advantageously arranged as a silicon material applied epitaxially to a silicon oxide, wherein the waveguide thickness may be approximately 400 nanometers. The optical waveguide may have an elongated strand shape, but may, in order to amplify the interaction between the 2D nanomaterial in a first section also be curved several times, for example taking a meandering or spiral shape. Two longitudinal sections may therein be parallel to one another and/or extend at a constant distance to one another and a light beam may travel through them in the same or opposite direction.

FIG. 4 is a schematic view of the sensor arrangement including a substrate 5, a silicon oxide layer 6, and a silicon waveguide material 7 applied epitaxially to the silicon oxide. The waveguide material 7 is largely covered by a cover layer 8, however a first section in the shape of a window 9 with a length of approximately 1 mm is left uncovered. The cover layer is made of silicon dioxide. In the area of the window, the cover layer is omitted or consists of a material that reflects the light less. In this area, which is designated by a dotted line in FIG. 4, an increased evanescent wave range exits the waveguide material 7, so that this wave range may interact with the material of the membrane 3'. The 2D nanomaterial of the membrane typically has a higher dielectric permittivity than air, so that the interaction between the evanescent wave and the 2D nanomaterial causes a change of the propagation constant of the light propagating along the optical waveguide 7. If the membrane 3', as shown in FIG. 4, is deflected such that it approaches the waveguide material 7 in the area of the window 9, the influence of the evanescent wave range is amplified. The change in the propagation constant may be determined by comparing the phasing with a light wave that is not influenced by the 2D nanomaterial. This may, for example, be a second mode that moves along the optical waveguide material 7 in such a manner that an evanescent wave range is smaller than the evanescent wave range of a first measures mode, or a light propagating along the first optical waveguide 7 may be compared to a light component being transported through a second optical waveguide not subjected to the influence of the membrane 3'/of the 2D nanomaterial.

Such a second optical waveguide may, for example, be arranged on the substrate 5 such that it does not have a window and/or that the distance between it and the membrane 3' is always greater than the distance between the waveguide 7 and the membrane.

A measurement of the change in the propagation constant is schematically shown in FIG. 5. Shown there is a coherent light source 10, from which coherent light is guided into the first optical waveguide 7 and a second optical wave guide 7'. The optical waveguide 7 is at least partially free of its cover in the area of a window 11 in a first section 9 such that in this area a strong evanescent wave range is created with which the membrane 3' can interact. The light further propagates along the first optical waveguide 7 to an interferometer 12, where the light transported along the first optical waveguide 7 is interferometrically superpositioned on the light transported along the second optical waveguide 7' in order to measure phasing differences. In the diagram on the right side of FIG. 5, the distance s, that the membrane is moved along its deflection, is indicated on the x-axis. The membrane deflection thus increases going from left to right. The interferometrically superpositioned signal of the light beams transported by the optical waveguides 7, 7' is visualized on the y-axis. If the membrane moves in a linear fashion, a phase difference of $\lambda/2$ between the light interacting with the 2D nanomaterial and the light not interacting with the nanomaterial is measured several times along the deflection of the membrane. An interferometric evaluation can thus be used to measure the deflection of the membrane 3, 3' with a high resolution and without the use of force.

The sensor device shown has the advantage that the 2D nanomaterials used are highly elastic and chemically resistant, have a high break resistance, and may be manufactured as very thin layers. The sensor device has a very simple design, does not require shielding nor, with the exception of the interferometric measurement, a power supply. A very small and lightweight construction is possible. Its sensitivity to deflections in the membrane is very high and can furthermore be adjusted dynamically. Due to the membrane's low mass, very quick changes in the deflection may be detected, wherein the detection speed is limited by the evaluation electronics.

The invention claimed is:

1. A sensor device comprising:
   a deflectable membrane made of a flexible material, wherein the membrane contains a layer made of a 2D nanomaterial or consists of a 2D nanomaterial,
   a first optical waveguide, adjacent to the membrane and extending along the surface of the membrane at least in a first section, for guiding light, such that the membrane is deflectable relative to the optical waveguide or that the membrane in the deflected state approaches the optical waveguide, and
   a measuring device, disposed along the first optical waveguide, for measuring the influence of the membrane on an evanescent wave range of the light within the first section.

2. The sensor device according to claim 1, further comprising a device for irradiation of coherent light at least into the first optical waveguide and also into a second optical waveguide, and an interferometric measuring device for measuring the propagation constant or a change in the propagation constant of the light along the first optical waveguide, in comparison to the light that propagates along the second optical waveguide, is provided.

3. The sensor device according to claim 1, wherein the membrane has a graphene layer of less than 10 atomic layers.

4. The sensor device according to claim 1, wherein the membrane has a layer of less than 10 atomic layers, with a single atomic layer of one of the following substances: graphene oxide, transition metal dichalcogenide, group III-IV semiconductors, molybdenum disulfide, boron nitride, metal oxide, black phosphorus or silicon or Germanium 2D material.

5. The sensor device according to claim 1, wherein the measuring device includes an interferometer.

6. The sensor device according to claim 5, wherein the interferometer is connected to the first optical waveguide as well as a second optical waveguide, wherein the second optical waveguide is arranged such that the membrane exerts no influence on the light that is guided along the second waveguide.

7. The sensor device according to claim 1, wherein at least the first optical waveguide is a nanophotonic silicon waveguide or includes one of the following materials: silicon, silicon nitride, III-V waveguide, silicon oxide/nitride waveguide, SoI (silicon on insulator).

8. The sensor device according to claim 1, wherein the membrane delimits a fluid-filled first space and is deflectable by pressure changes within the first space.

9. The sensor device according to claim 1, wherein the membrane includes a ferromagnetic material or a ferromagnetic component such that a magnetic field acting on the membrane causes a deflection of the membrane.

10. The sensor device according to claim 1, wherein the distance between the membrane and the first optical waveguide is adjustable.

11. A method for measuring pressures or pressure changes using a membrane made of a 2D nanomaterial, said method comprising:
   guiding coherent light through at least one optical waveguide arranged close enough to the membrane for an evanescent part of the light guided along the first optical waveguide to interact with the membrane material in a first section to determine deflection of the membrane relative to the at least one optical waveguide, and for a phasing and/or a phase shift of the light guided along the first optical waveguide to be measured and to be compared to the phasing of light not interacting with the membrane.

* * * * *